United States Patent
Baer et al.

(10) Patent No.: US 7,362,542 B2
(45) Date of Patent: Apr. 22, 2008

(54) SLIDER WITH UNDERPASS LEAD CONFIGURED AS A COOLING PLATE

(75) Inventors: Amanda Baer, Campbell, CA (US);
Tsung Yuan Chen, San Jose, CA (US);
David Patrick Druist, San Jose, CA (US); Edward Hin Pong Lee, San Jose, CA (US)

(73) Assignee: Hitachi Global Storage Technologies Netherlands, B.V., Amsterdan (NL)

( * ) Notice: Subject to any disclaimer, the term of this patent is extended or adjusted under 35 U.S.C. 154(b) by 389 days.

(21) Appl. No.: 10/881,196

(22) Filed: Jun. 29, 2004

(65) Prior Publication Data

US 2005/0286169 A1   Dec. 29, 2005

(51) Int. Cl.
*G11B 5/17*     (2006.01)
*G11B 33/14*    (2006.01)

(52) U.S. Cl. .................................... 360/123
(58) Field of Classification Search ............. 360/123
See application file for complete search history.

(56) References Cited

U.S. PATENT DOCUMENTS

| | | | |
|---|---|---|---|
| 4,698,708 A | 10/1987 | Lazzari | 360/235.3 |
| 5,486,968 A | 1/1996 | Lee et al. | 360/126 |
| 5,761,013 A | 6/1998 | Lee et al. | 360/126 |
| 6,678,942 B1 | 1/2004 | Sasaki | 29/603.25 |
| 6,700,738 B1* | 3/2004 | Sin et al. | 360/126 |
| 7,085,099 B2* | 8/2006 | Sasaki et al. | 360/123 |
| 2002/0054460 A1 | 5/2002 | Takahashi et al. | 360/317 |
| 2002/0067571 A1 | 6/2002 | Yoshida et al. | 360/126 |
| 2005/0225897 A1* | 10/2005 | Liu et al. | 360/126 |

* cited by examiner

*Primary Examiner*—Julie Anne Watko
(74) *Attorney, Agent, or Firm*—Patent Law Office of Larry Guernsey; Larry Guernsey

(57) ABSTRACT

A slider is disclosed having a continuous coil including front coils, back coils, and a center tab, a write head including upper and lower poles which sandwich at least a portion of the front coils of the continuous coil, and at least one underpass lead, which passes under a portion of the back coils of the continuous coil to make electrical connection with the center tab of the continuous coil. Also disclosed are first and second variations of methods for fabricating the slider with underpass leads.

8 Claims, 10 Drawing Sheets

SLIDER WITH UNDERPASS LEAD CONFIGURED AS A COOLING PLATE

BACKGROUND OF THE INVENTION

1. Field of the Invention

The present invention relates generally to computer disk drives and more specifically to fabrication of the induction coil for use with magnetic write heads.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" onto which the read/write sensors of the magnetic head are fabricated. The slider flies above the surface of the disks on a thin cushion of air, and the surface of the slider which faces the disks is called an Air Bearing Surface (ABS).

FIG. 3 shows a detail view of a magnetic head 14. A coil 18 is included which is configured as a single long strip, which is then curved into the coil shape. There is thus an inner-most turn of the coil, which will be referred to, for convenience, as the coil center 34. There is also an outer-most end 36 to which electrical connection is made to pads (not shown). A center connection called the center tab 38 makes an electrical connection to the coil center 34, thus allowing the coil to be energized to create the magnetic field by which writing operations are accomplished. To make electrical connection with the center tab 38, it has been the common practice to create an overpass lead 40 which reaches over the coil 18 and makes this connection to the center tab 38. Although this has been the general practice in the slider fabrication industry, this configuration has several disadvantages.

During fabrication, it is common to create a coil interconnect 39 (not visible in FIG. 3) which refers to the pedestal or layer plated on the location of the coil center tab for the connection of the coil center tab to the overpass lead 40.

During perpendicular and single layer coil longitudinal write head production, the write pole can be formed by the ion milling process. Damage due to ion milling on the coil interconnect, and the tall re-deposition "fence" surrounding the interconnect edges can result. These tall "fences" present problematic areas for subsequent wet processing As a result, solutions from wet processing seeps through areas around the "fences" and attack the expose coil interconnect, causing interconnect materials to be etched away. Prior solutions cannot eliminate this problem completely. In such a small area, such as the central tab, reducing the interconnect metal will lead to reducing the chance of a good contact between the "over passing" lead and the coil interconnect. When poor contact to either the coils or other features such as the electronic lapping guides (ELG) result, the head is scrapped. The longer the small electrical interconnects for the coil and lapping guides are exposed on the wafer, the greater the chance of damage or poor electrical contact resulting. Also, with the overpass lead design, electrical testing of the coil and ELG is not possible until near the end of the manufacturing line. If a problem arises in the coil or ELG processing, it can take up to a few weeks to detect, during which further production is jeopardized.

One of the present inventors has previously addressed this problem by patenting method and apparatus in U.S. Pat. No. 5,486,968 and U.S. Pat. No. 5,761,013 which include a planarization layer having three sections, two of which connect to MR leads and the third of which connects to the inner coil tab of the inductive coil. The overpass lead is thus replaced by planarization layer which passes under the coils. At the time of these earlier inventions, it was thought to be an important advantage of this planarization layer that it provide a flat surface to build the coils upon. Earlier attempts to make an "underpass" lead left lumps in the surface where the coils were to be deposited, which often impaired the quality of coils. Thus the planarization layer was intended to cover most of the area on which the coil was to be deposited, and thus was more extensive than necessary for the purpose of providing an electrical lead to the coil interconnect. Fabrication of an extensive element such as the planarization layer naturally consumes more time and materials than fabrication of an underpass lead of smaller extent, when the underpass lead is not used for the dual purpose of providing an electrical path and also forming a flat platform for construction of the induction coil.

Thus there is a need for a slider having an underpass lead which is not constrained in shape to act as a planarization layer for induction coil fabrication. There is also a need for a simplified method of fabrication for a slider having such an underpass lead.

SUMMARY OF THE INVENTION

A first embodiment of the present invention is a slider having a continuous coil including front coils, back coils, and a center tab, a write head including upper and lower poles which sandwich at least a portion of the front coils of the continuous coil, and at least one underpass lead, which passes under a portion of the back coils of the continuous coil to make electrical connection with the center tab of the continuous coil.

Also disclosed are first and second variations of methods for fabricating the slider with underpass leads.

It is an advantage of the present invention that fabrication of the coil and therefore of the entire magnetic head is simplified.

It is a further advantage that the lead to the center tab of the coil passes under the coil, so that fabrication of the coil is simplified.

It is another advantage that the underpass lead can be made of almost any shape, and is not constrained to being a flat plane.

It is yet another advantage that after fabrication of the coil, interconnects are then buried before write pole processing, reducing their exposure to damage in subsequent processing.

It is a further advantage that the coils and ELGs can be electrically tested immediately after the coil fabrication process, as opposed to significantly later in the manufacturing line. Therefore, defects in the coils may be detected at much earlier stages, leading to less scrap.

An additional advantage is that the area of the under passing lead can be spread out to allow cooling of the coil through heat sinking effects.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE EMBODIMENTS

Figure 1:
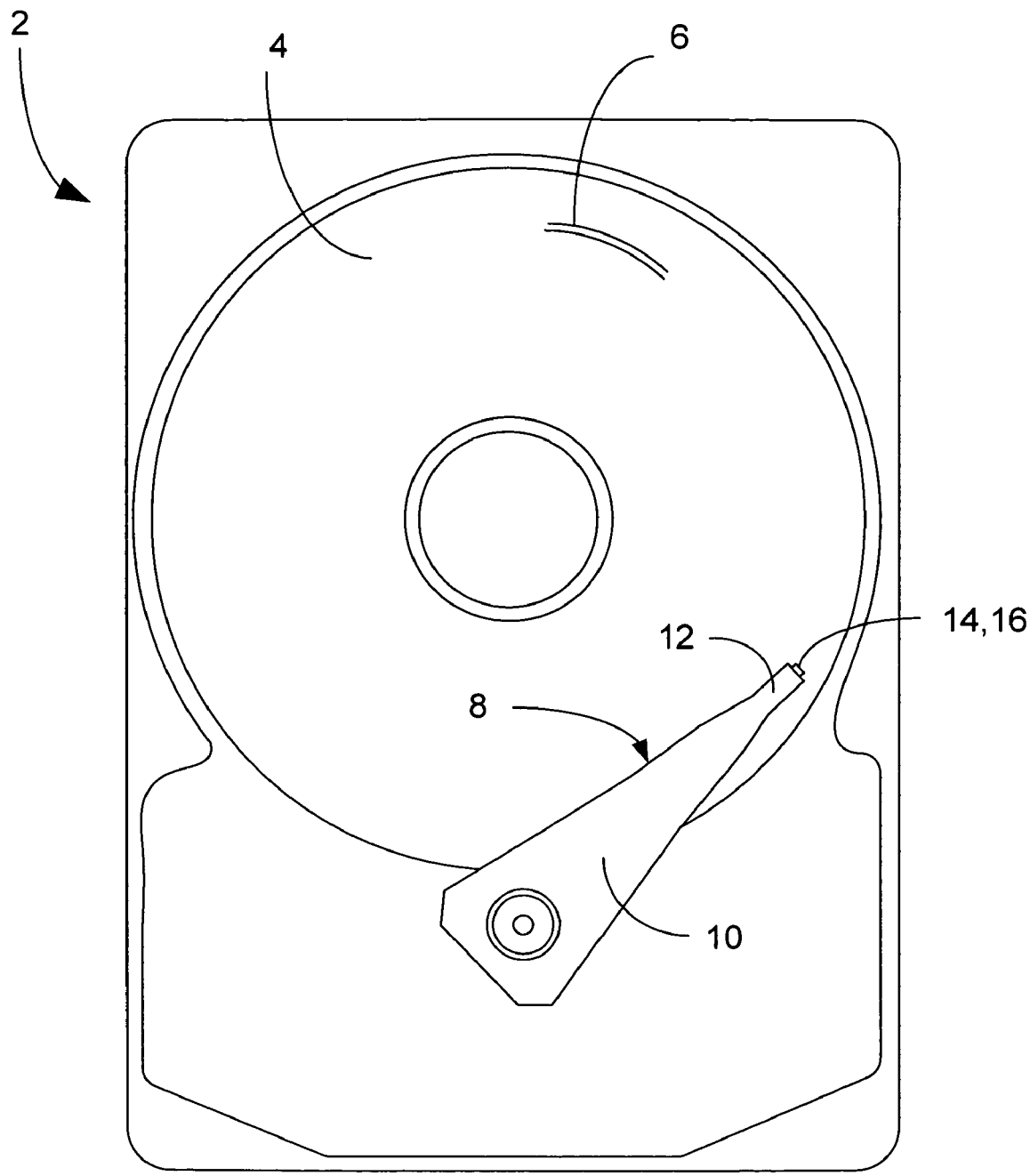
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
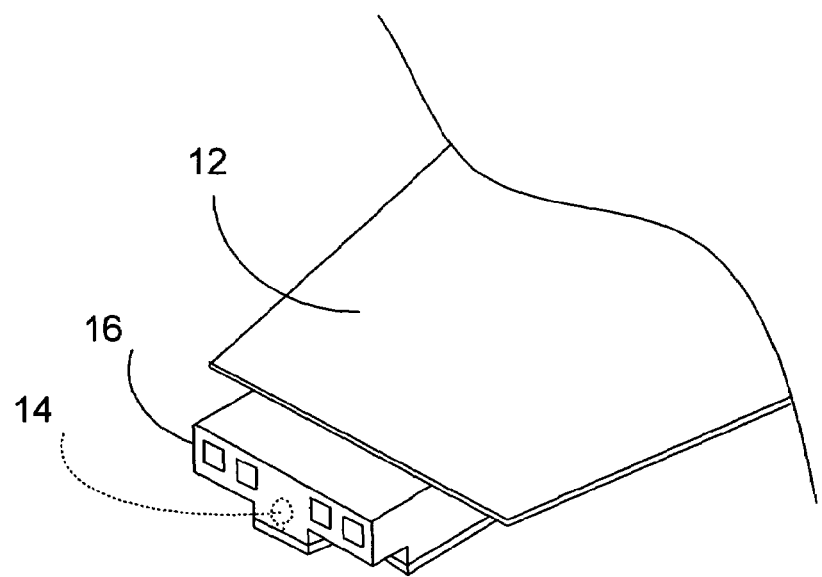
FIG. 2 illustrates a perspective view of view of an exemplary slider and suspension.
Figure 3:
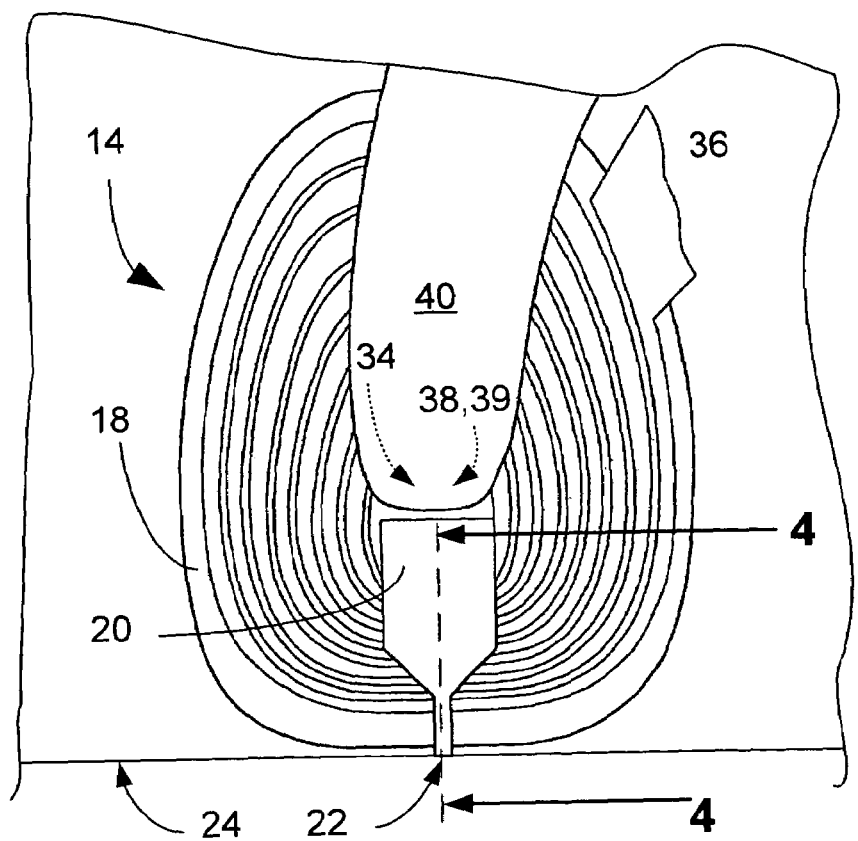
FIG. 3 shows a top plan view of an exemplary read/write head.
Figure 4:
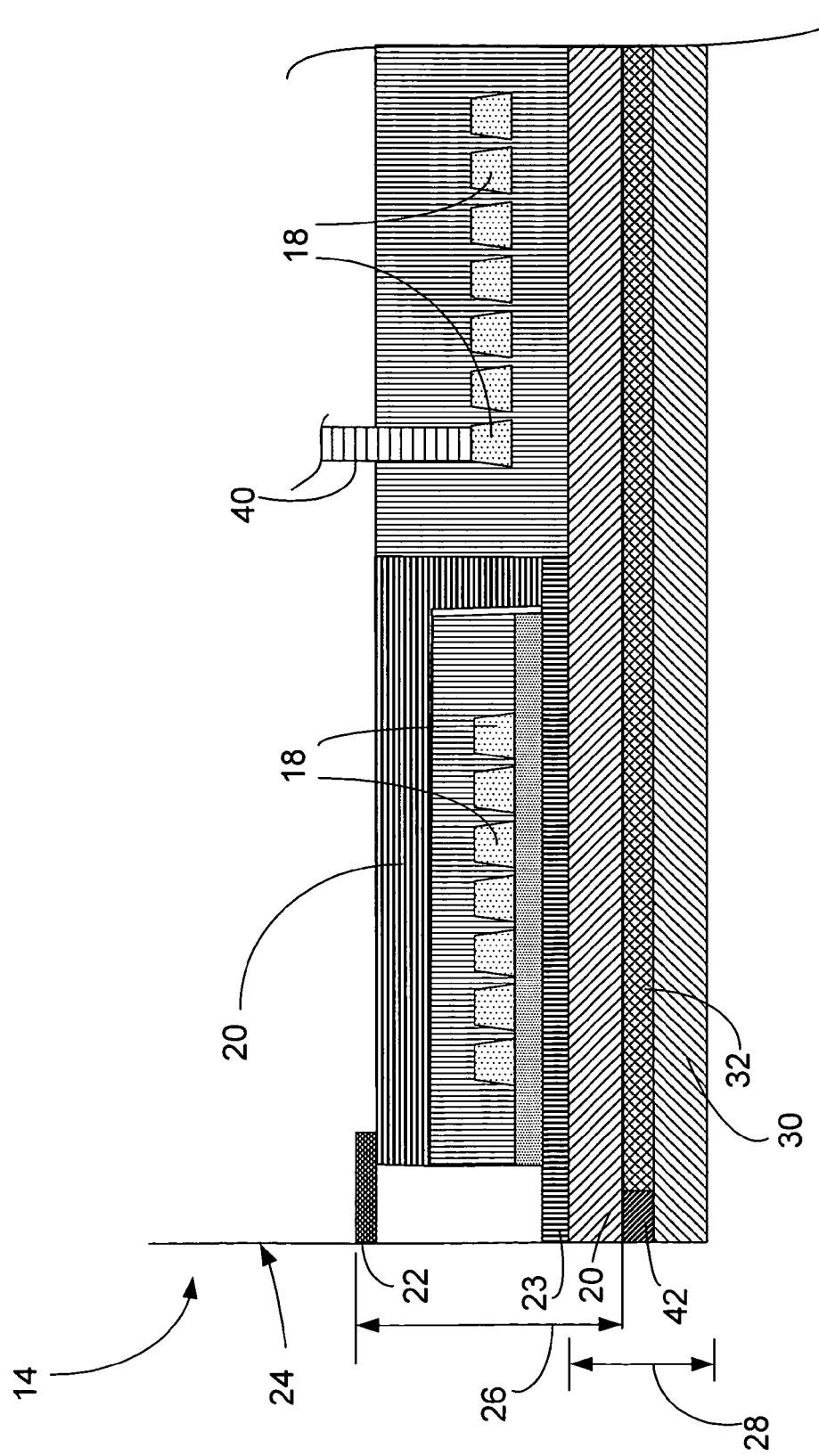
FIG. 4 is a cross-section view of a perpendicular read/write head having an overpass lead of the prior art.
Figure 5:
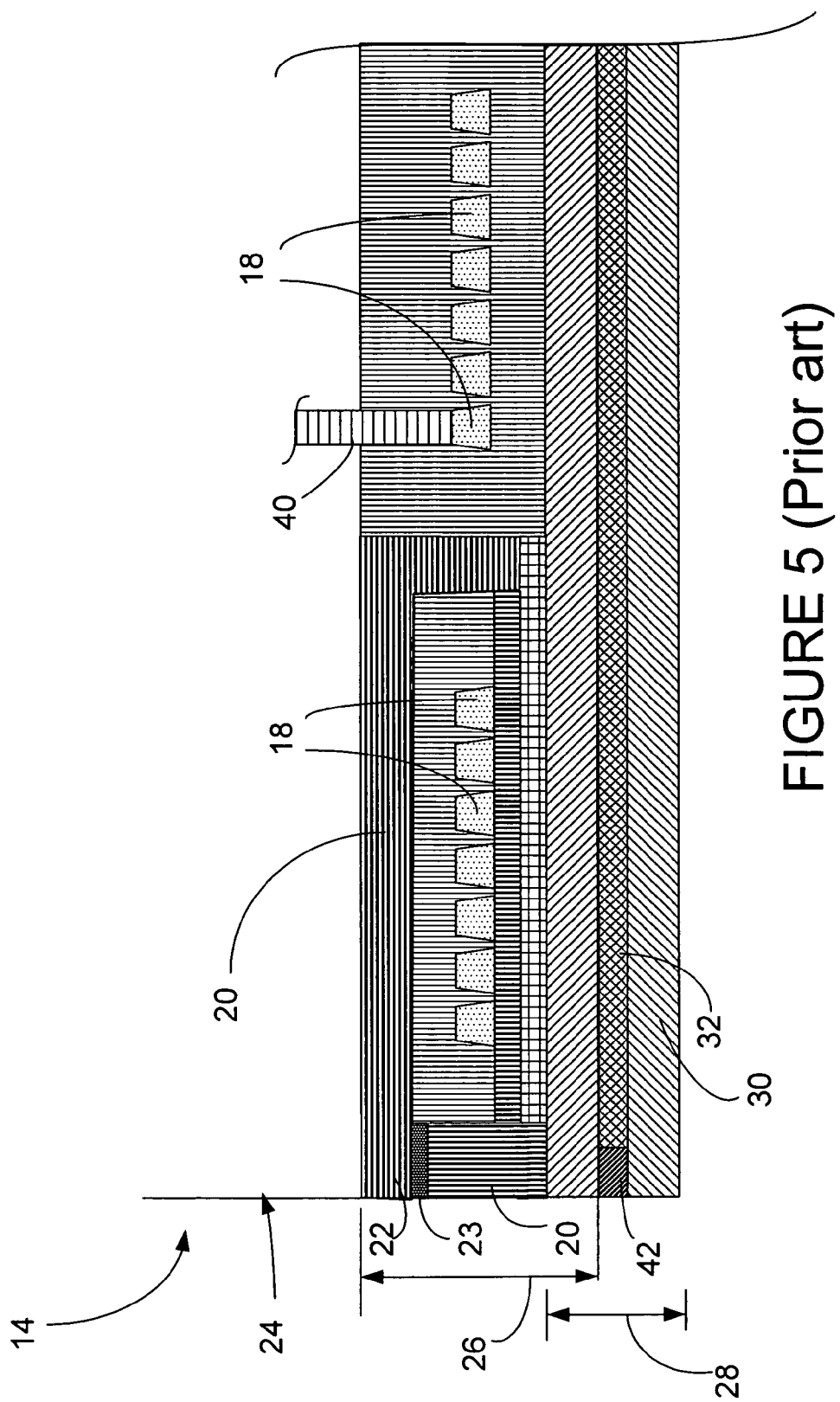
FIG. 5 is a cross-section view of a longitudinal read/write head having an overpass lead of the prior art.

FIG. 2 shows a slider 16 in more detail being supported by suspension 12. The magnetic head 14 is shown in dashed lines, and in more detail in FIGS. 3-7. The magnetic head 14 includes a coil 18 and P1 pole 20. The second pole P2 22 is separated from P1/S2 by write gap 23. In a configuration of read head where Current is Perpendicular to the Plane (CPP), Shield S1 30 and P1/S2 20 act as electrodes supplying current to the read sensor 50 which lies between them. An insulation layer 32 also separates the S1 30 and P1/S2 20 electrodes in the area behind the read sensor 42, so that they do not short out along their length.

The magnetic head 14 flies on an air cushion between the surface of the disk 4 and the air bearing surface (ABS) 24 of the slider 16. The write head portion 26 and the read head portion 28 are generally shown, with the read head sensor 50 and the ABS 24.

Returning to FIG. 3, the coil 18 is configured as a single long strip, which is then curved into the coil shape. There is thus an inner-most end of the coil, which will be referred to for convenience as the coil center 34, as well as an outer-most end 36. A center connection called the center tab 38 makes an electrical connection to the coil center 34, thus allowing the coil to be energized to create the magnetic field by which writing operations are accomplished. During fabrication, it is common to create a coil interconnect 39 (not visible in FIG. 3) which refers to the pedestal or layer plated on the location of the coil center tab 38. To make electrical connection with the center tab 38, it has been the common practice to create an overpass lead 40 which reaches over the coil 18 and makes this connection to the center tab 38. Although this has been the general practice in the slider fabrication industry, this configuration has several disadvantages, as discussed above, in terms of difficulty of processing and fabrication.

The present invention, as shown in FIGS. 14-15, 21-22, and 26-27 is a slider with underpass leads 50, which uses an "under passing" lead to connect the bonding pads to the coil 18 at the coil interconnect 39, and the electrical lapping guides (ELGs) at their interconnects. In this design, the coil interconnect 39 is not exposed to the harsh milling from the write pole processing because no interconnect metal is exposed at the milling surface. Thus no interconnect metal etching or "fencing" occurs. Thus, there is no interaction with subsequent wet processing.

In addition to ensuring good contact between the lead and the coil, the "under passing" design has three additional benefits. First, the area of the "under passing" lead can be spread out to allow cooling of the coil through heat sinking effects. Secondly, using the underpassing lead, the coils and ELGs can be electrically tested immediately after the coil process, as opposed to significantly later in the manufacturing line. This will lead to earlier detection of problems in the coil and ELG processes, leading to less scrap. After the coil process, these interconnects are then buried before write pole processing, reducing their exposure to damage in subsequent processing.

Figure 6:
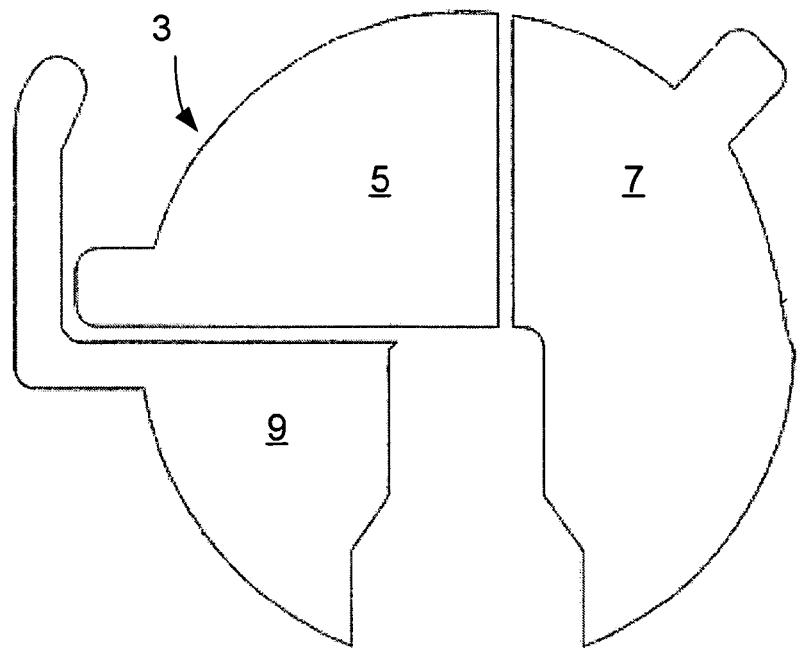
FIG. 6 is a top plan view of a planarization layer of the prior art.
Figure 7:
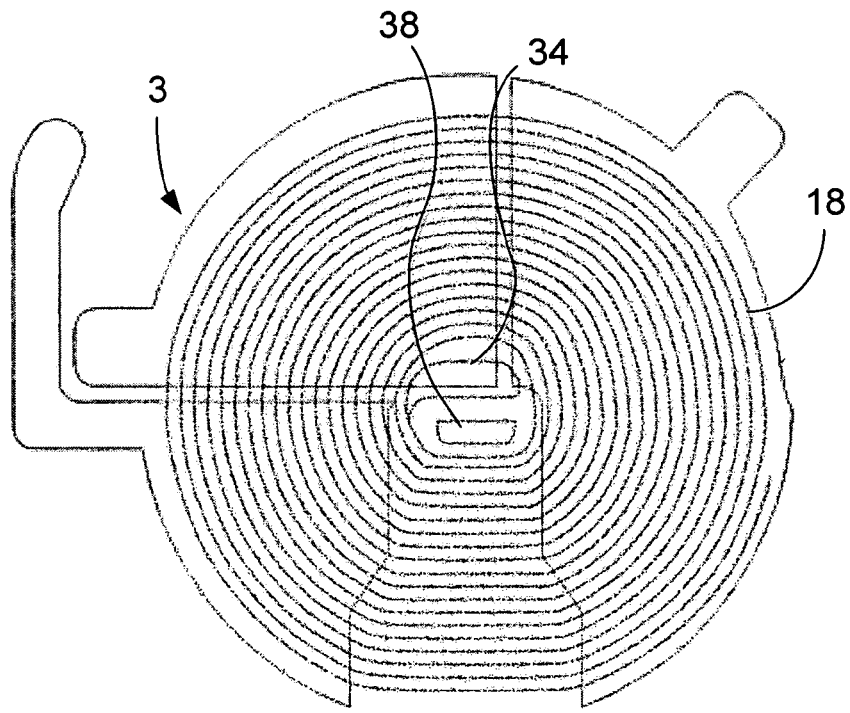
FIG. 7 is a top plan view of a planarization layer with coil of the prior art.

Turning now to FIG. 6-7 (Prior art), one of the present inventors has previously addressed this problem by including a planarization layer 3 having three sections 5, 7, 9, two of which, sections 7, 9 connect to MR leads (not shown) and the third of which, section 5 connects to the inner coil tab 38 of the inductive coil 18. The overpass lead is thus replaced by planarization layer 3 which passes under the coils 18.

At the time of these earlier inventions, it was thought to be an important advantage of this planarization layer that it provide a flat surface to build the coils upon. Earlier attempts to make an "underpass lead" left lumps in the surface where the coils were to be deposited, which often impaired the quality of coils. Thus the planarization layer was intended to cover most of the area on which the coil was to be deposited, and thus was more extensive than necessary for the purpose of merely providing an electrical lead to the coil interconnect.

Advances in fabrication technology have now made it possible to use underpass leads 58 (see FIGS. 14-15, 21-22, and 26-27) which are of most any shape, and are not restricted to the planarization layer structure of the prior art. Thus underpass leads 58 can be of very minimal extent and can be placed to connect to the coil center tab 38 and then the whole area treated with Chemical Mechanical Polishing (CMP) to produce a flat floor for construction of the induction coil 18. The underpass lead 58 can also be shaped for other secondary purposes, such as to sink the heat from a certain portion of the coil 18 or heat a certain portion of the slider 50, without affecting the rest. The underpass lead 58 thus also avoids the disadvantages of the overpass lead discussed above.

The important stages in a first variation of fabrication of a slider 50 of the present invention having an underpass lead 58 are shown in FIGS. 8-15. In a cross-sectional view, the turns of the induction coil 18 are shown as blocks. The blocks representing the cross-sections of the coils can be thought of as having two sections or as forming two groups on either side of the center tab or coil interconnect. One group of coils lies closer to the ABS 24 and these are enclosed by the write head first and second poles 20, 22 (see FIG. 5). For ease of reference in the figures that follow, this group will be referred to the front coil group 54, and the other group lies on the side of the slider farthest from the ABS, and will be referred to as the back coil group 56 (see FIGS. 13 and 21). Since the turns represented by these blocks actually make up one continuous coil, the left most block of the front coil group 54 continues out of the plane of the paper to become the right-most block of the back coil group 56, which then goes on into the plane of the paper to become the second left-most of the front coil group 54, and so on working towards the center of the coil, to terminate with the coil center 34 or center tab 38.

On the scale shown, the two groups are actually separated much farther than shown, thus wave brackets are shown to indicate that more distance exists between the two sides which is not shown. Even so, no attempt has been made to draw the elements to scale. Also, in the figures which follow, the terms front coil group site 55 and back coil group site 57 will be used to indicate the sites where these groups will be eventually located, even when the coil loops have not yet been fabricated on these sites.

Figure 8:
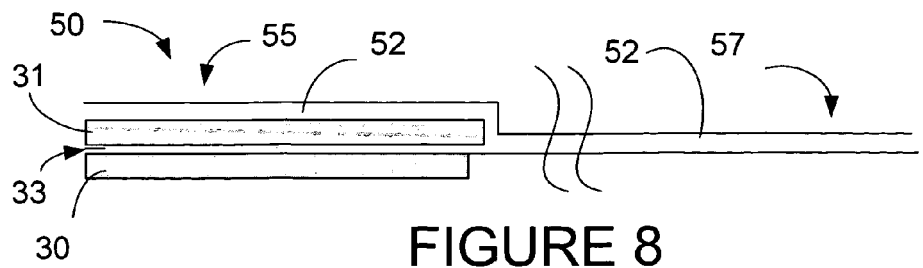
FIGS. 8-13 show cross-sectional views of stages in a first variation of the method of fabrication of a slider with underpass lead of the present invention.

FIG. 8 shows the initial stage in the fabrication of the slider with underpass lead 50. The S1 layer 30, read head transducer 33 and S2 layer 31 have been fabricated according to conventional processing steps known in the art on the front coil group site 55. An insulation layer 52 is then deposited on the front coil group site 55 and the back coil group site 57. The insulation layer 52 on the back coil group site 57 covers a conventional substrate, not shown here.

Figure 9:
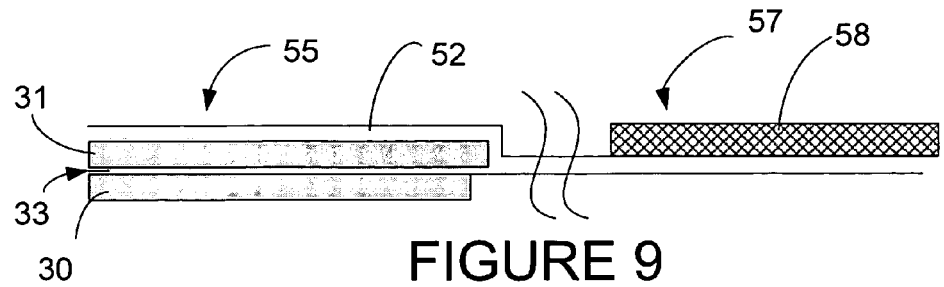

FIG. 9 shows the addition of the underpass lead 58 upon the insulation layer 52 at the back coil group site 57. As discussed above, this underpass lead 58 can be made in a number of shapes and configuration, and is not restricted to being a planarized surface as a platform for coil formation.

Figure 10:
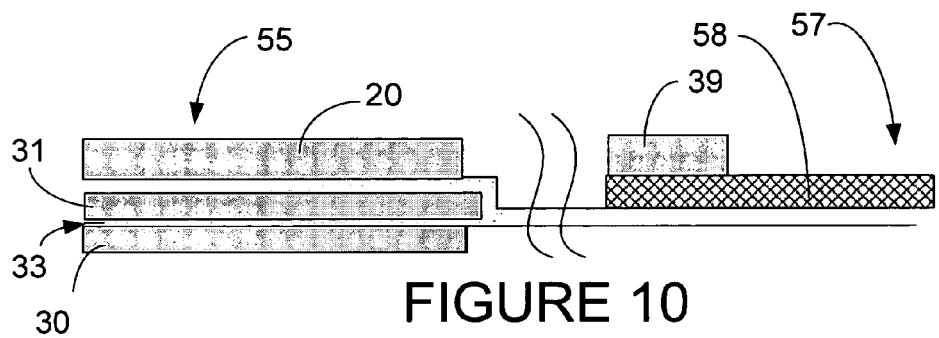

FIG. 10 shows the formation of the P1 pole 20 of the write head 26 on the front coil group site 55, and also the coil interconnect 39 is formed on the underpass lead 58 at the back coil group site 57. The P1 pole 20 and coil interconnect 39 are preferably of the same material, which makes this stage more efficient, as they can be completed in a single step, rather than in separate stages.

Figure 11:
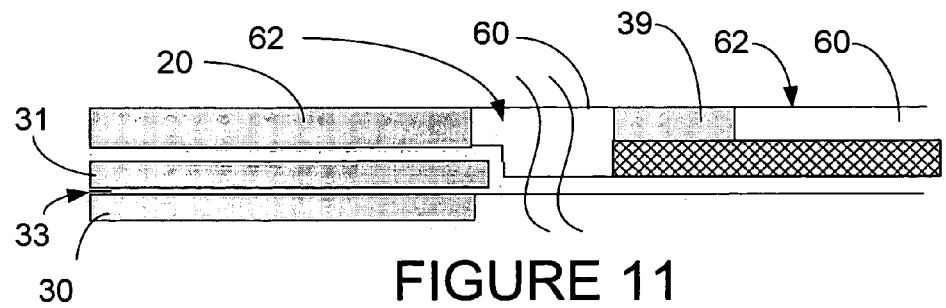

FIG. 11 shows the next stage in which fill material 60 is preferably alumina but which could include $SIO_2$ or other non-doped, non-conductive dielectics is deposited in the openings 62 to the sides of the P1 pole 20 and coil interconnect 39. Chemical Mechanical Polishing (CMP) is next used to planarize the upper surface of the structure.

Figure 12:
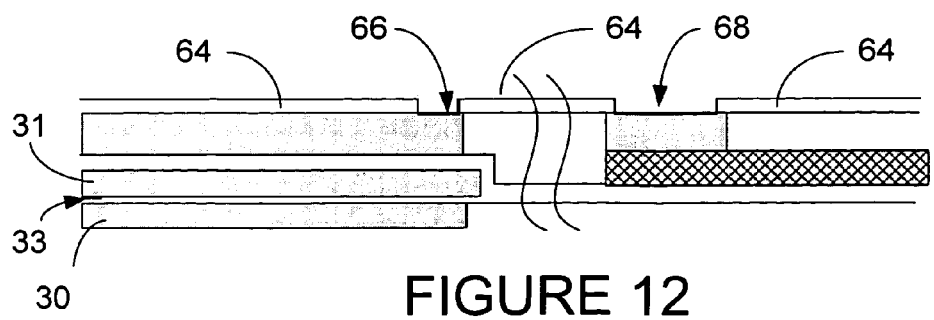

FIG. 12 shows insulation material 64 has been added, with gaps 66, 68 left in the insulation material 64.

Figure 13:
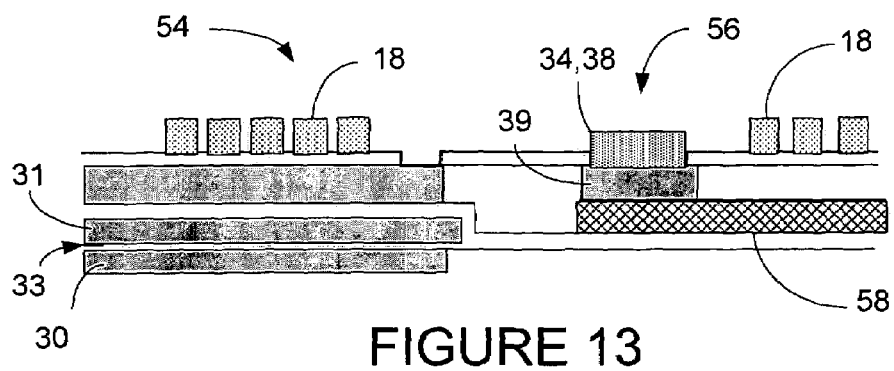

FIG. 13 shows the formation of the front coil group 54 and back coil group 56 of the coil 18, including the coil center 34, which also serves as the coil center tab 38 and thus forms electrical connection with the underpass lead 58.

Figure 14:
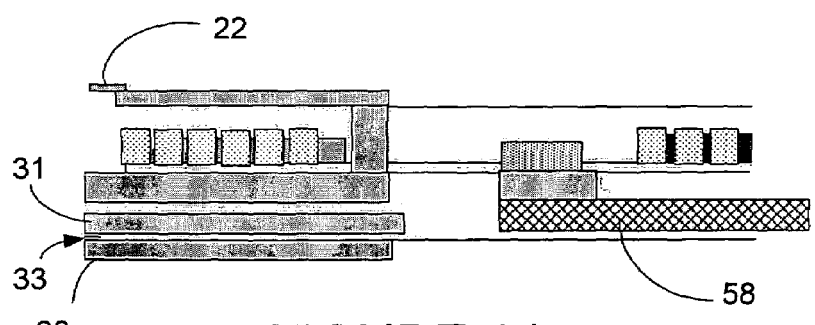
FIG. 14 is a cross-sectional view of a perpendicular read/write head having an underpass lead fabricated according to the first variation of the method of fabrication of the present invention.
Figure 15:
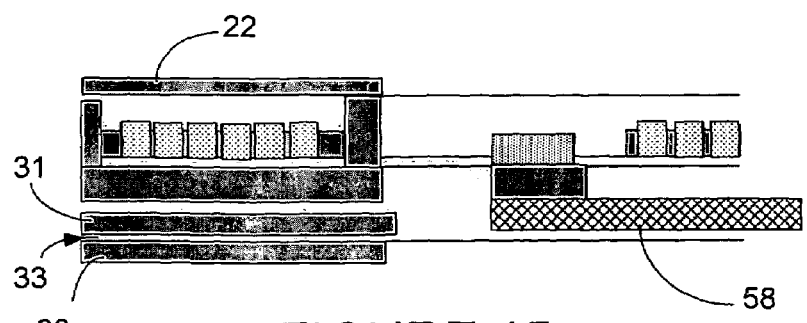
FIG. 15 is a cross-sectional view of a longitudinal read/write head having an underpass lead fabricated according to the first variation of the method of fabrication of the present invention.

From this point, the fabrication is completed by conventional techniques to fabricate the second pole P2 22 to make the perpendicular writing head shown in FIG. 14, or the longitudinal writing head shown in FIG. 15.

The important stages in a second variation of fabrication of a slider 50 having an underpass lead 58 are shown in FIGS. 16-23.

Figure 16:
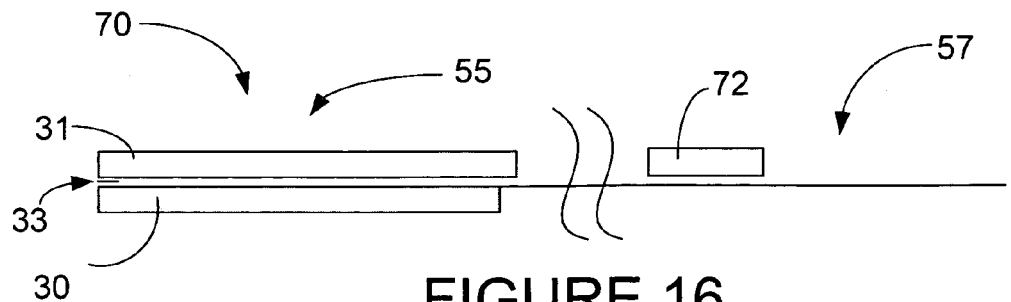
FIGS. 16-21 show cross-sectional views of stages in a second variation of the method of fabrication of a slider with underpass lead of the present invention.

FIG. 16 shows the initial stage in the fabrication of the alternate slider with underpass lead 70. The S1 layer 30, read head transducer 33 and S2 layer 31 have been fabricated according to conventional processing steps known in the art on the front coil group site 55. A center tab support 72 is deposited on the back coil group site 57 at the same time as the S2 layer 31.

Figure 17:
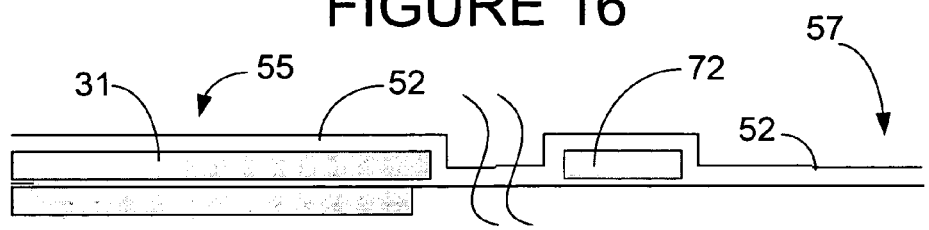

FIG. 17 shows the addition of an insulation layer 52 which covers the S1 layer 31 and center tab support 72 on the front coil group site 55 and back coil group site 57 respectively.

Figure 18:
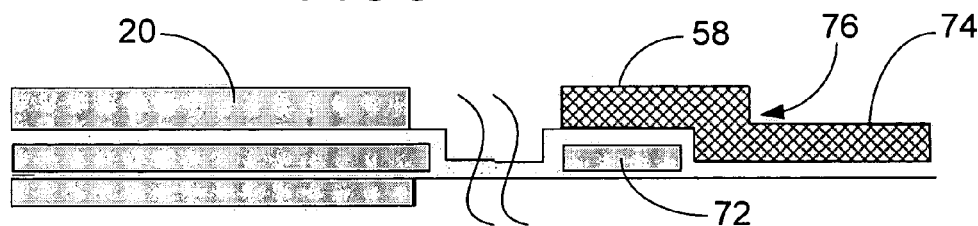

FIG. 18 shows the plating of the P1 pole 20 as well as the underpass lead 58 which now includes an underpass strap 74 which follows the contours of the step 76 created by the placement of the center tab support 72. The P1 pole 20, the underpass lead 58, and underpass strap 74 are preferably of the same material, which makes this stage more efficient, as they can be completed in a single operation, rather than in separate stages. As before, this underpass lead 58 can be made in a number of shapes and configuration, and is not restricted to being a planarized surface as a platform for coil formation.

Figure 19:
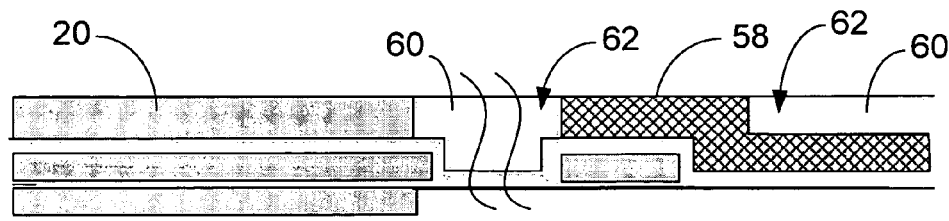

FIG. 19 shows the next stage in which fill material 60 is preferably alumina, but which could include $SIO_2$ or other non-doped, non-conductive dielectics, is deposited in the gaps 62 to the sides of the P1 pole 20 and underpass lead 58. Chemical Mechanical Polishing (CMP) is next used to planarize the upper surface of the structure.

Figure 20:
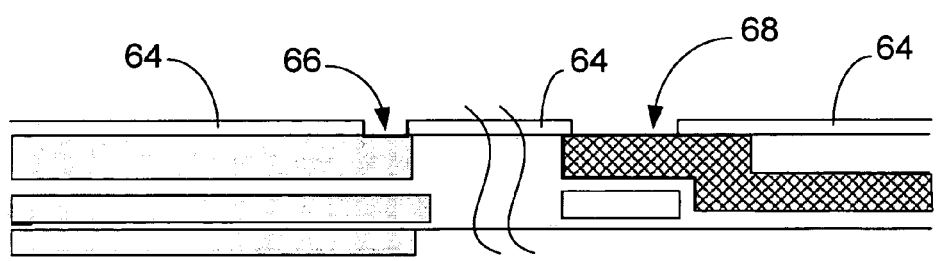

FIG. 20 shows insulation material 64 has been added, with openings 66, 68 left in the insulation material 64.

Figure 21:
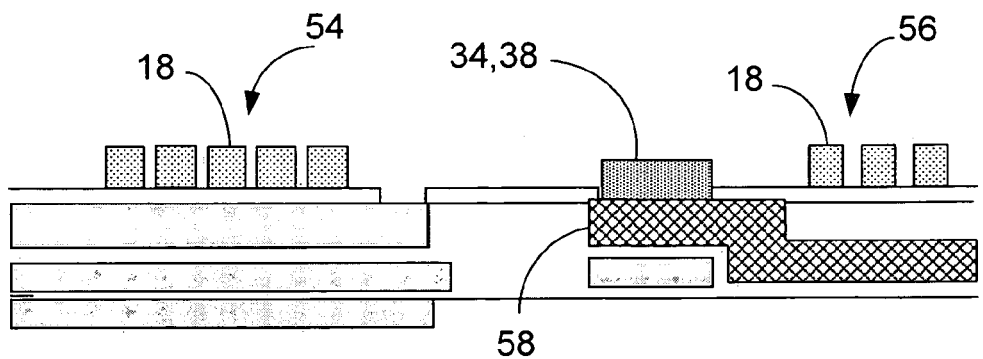

FIG. 21 shows the formation of the front coil group 54 and back coil group 56 of the coil 18, including the coil center tab 38 and thus forms electrical connection with the underpass lead 58.

Figure 22:
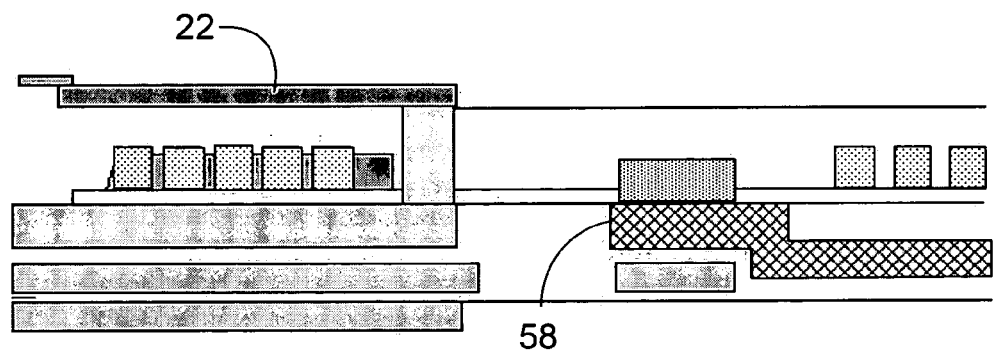
FIG. 22 is a cross-sectional view of a perpendicular read/write head having an underpass lead fabricated according to the second variation of the method of fabrication of the present invention.
Figure 23:
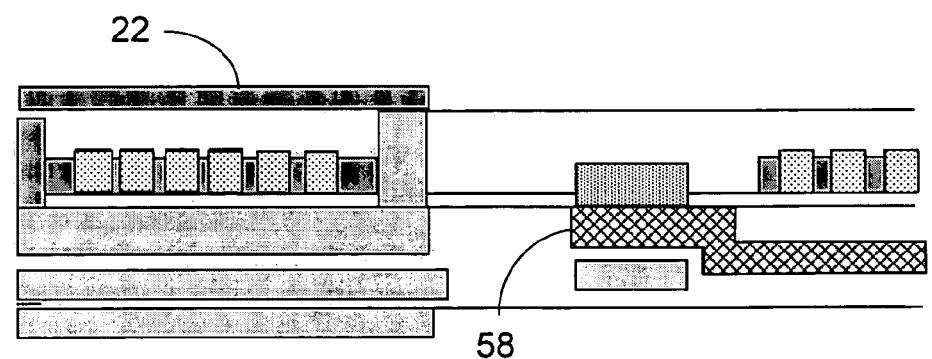
FIG. 23 is a cross-sectional view of a longitudinal read/write head having an underpass lead fabricated according to the second variation of the method of fabrication of the present invention.

From this point, the fabrication is completed by conventional techniques to fabricate the second pole P2 22 to make the perpendicular writing head shown in FIG. 22, or the longitudinal writing head shown in FIG. 23.

Figure 24:
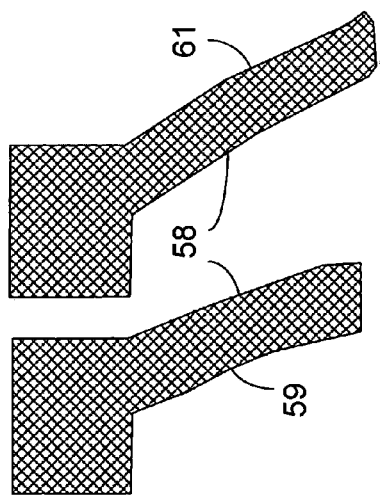
FIGS. 24-26 show top plan views of stages in the fabrication of a slider having underpass leads of the present invention.
Figure 25:
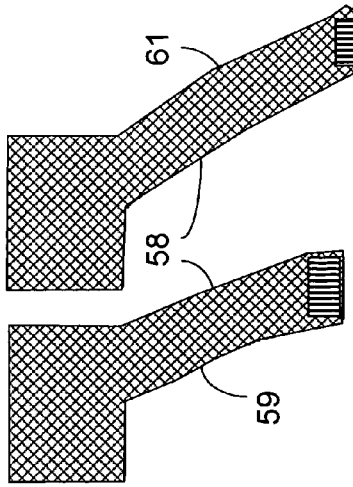
Figure 26:
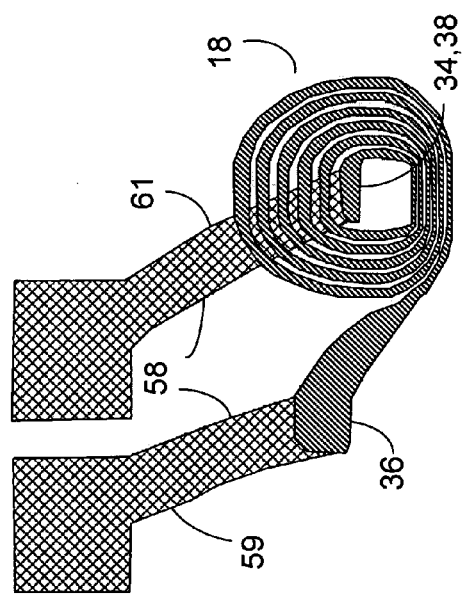

FIGS. 24-27 show some major stages of the fabrication process from an overhead view. In FIG. 24, underpass layers 58 are shown to have been fabricated, which include a first underpass lead 59 and a second underpass lead 61. In FIG. 25, lower pole layer 20 has been shown to have been deposited onto the underpass layers 58, with the center tab 38 in place on the second underpass lead 61. FIG. 26 shows the deposition of the coil 18, with the outer-most end 36 attached to the first underpass lead 59 and the center coil 34 connected to the center tab 38.

Figure 27:
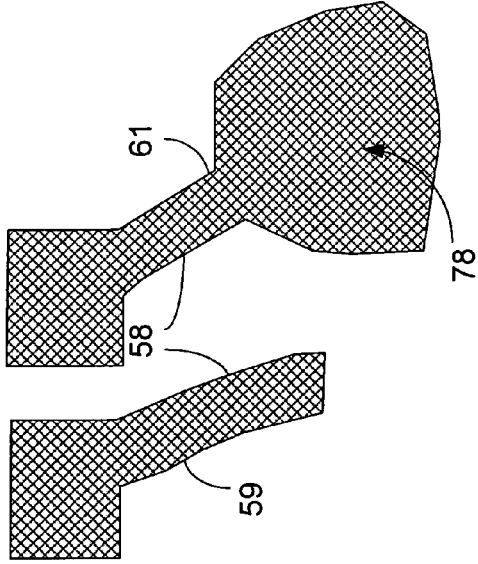
FIG. 27 shows a top plan view of another variation in the shape of the underpass leads of the present invention.

As discussed above the underpass leads are not restricted to being a planarization layer, as in the prior art, and can take many shapes and configurations. FIG. 27 shows a variation in which the second underpass lead 61 has been configured to include a cooling plate 78, which may be useful in conducting heat away from the coils 18. This is of course only one of many shapes that either of the underpass leads 58 may take. This freedom of configuration constitutes a major difference between the underpass leads of the present invention and the planarization layer of the prior art.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A slider comprising:
   a continuous coil including front coils and back coils, and a center tab;
   a write head including upper and lower poles which sandwich at least a portion of said front coils of said continuous coil; and
   at least one underpass lead, which passes under a portion of said back coils of said continuous coil to make electrical connection with said center tab of said continuous coil, wherein said underpass lead is configured as a cooling plate.

2. The slider of claim 1, wherein:
   said write head is configured as a perpendicular write head.

3. The slider of claim 1, wherein:
   said write head is configured as a longitudinal write head.

4. The slider of claim 1, wherein:
   said underpass lead and said center tab are connected by a coil interconnect.

5. A disk drive comprising:
   at least one hard disk;
   at least one slider including:
      a continuous coil including front coils and back coils, and a center tab;
      a write head including upper and lower poles which sandwich at least a portion of said front coils of said continuous coil; and
      at least one underpass lead, which passes under at least a portion of said continuous coil to make electrical connection with said center tab of said continuous coil, wherein said underpass lead is configured as a cooling plate.

6. The disk drive of claim 5, wherein:
   said write head of said at least one slider is configured as a perpendicular write head.

7. The disk drive of claim 5, wherein:
   said write head of said at least one slider is configured as a longitudinal write head.

8. The disk drive of claim 5, wherein:
   said underpass lead and said center tab are connected by a coil interconnect.

* * * * *